March 14, 1939. E. R. BERGMANN Re. 21,027
FEEDING HEAD FOR RECIPROCATING OR SHAKER CONVEYERS
Original Filed Nov. 11, 1935 2 Sheets-Sheet 1
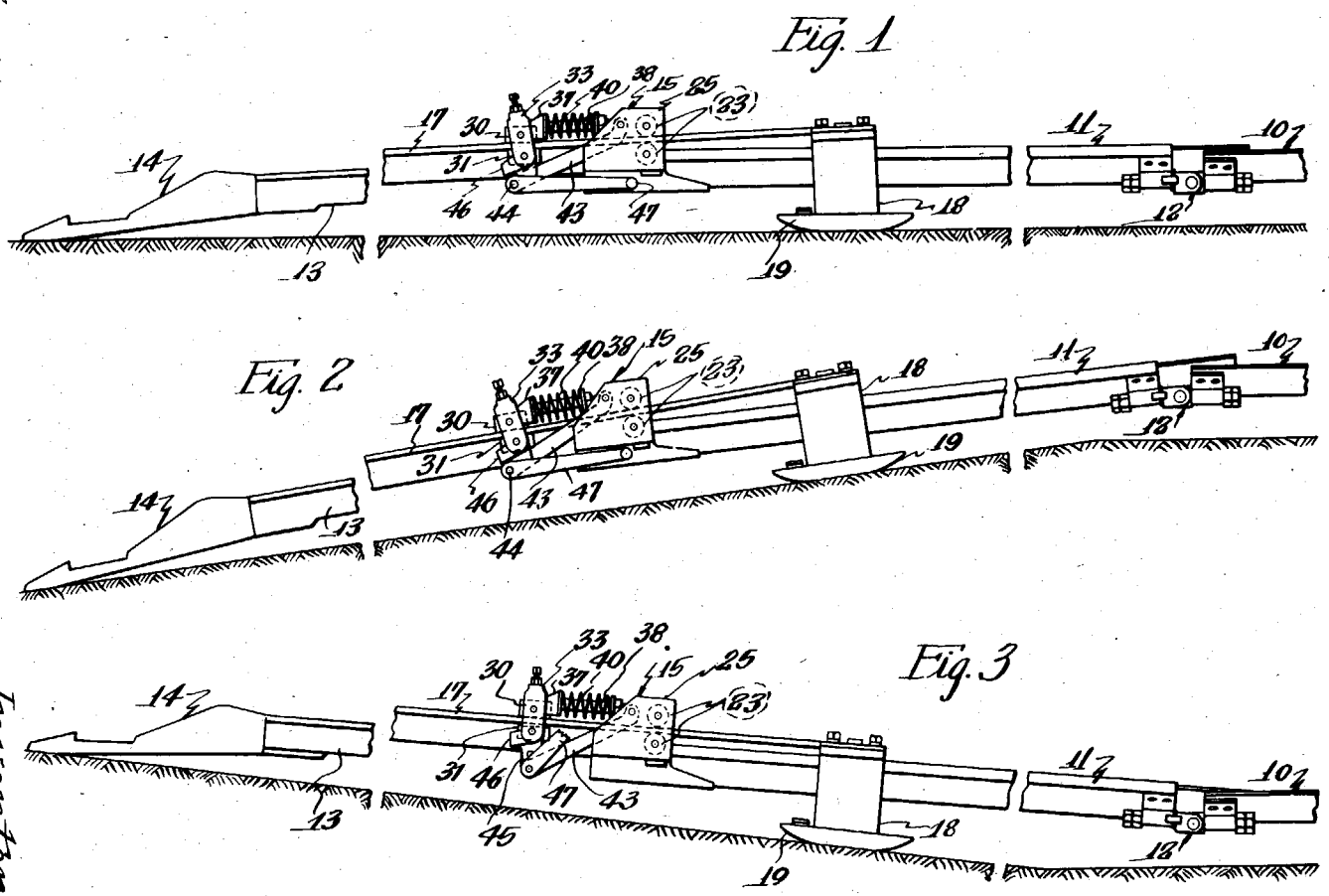
Witness:
Erwin C. Lange
Inventor:
Ernst R. Bergmann
Clarence F. Poole
Attorney March 14, 1939. E. R. BERGMANN Re. 21,027

FEEDING HEAD FOR RECIPROCATING OR SHAKER CONVEYERS

Original Filed Nov. 11, 1935 2 Sheets-Sheet 2

Witness:
Erwin C. Lange

Inventor:
Ernst R. Bergmann
Clarence F. Poole
Attorney

Reissued Mar. 14, 1939

Re. 21,027

UNITED STATES PATENT OFFICE 21,027

FEEDING HEAD FOR RECIPROCATING OR SHAKER CONVEYERS

Ernst R. Bergmann, Chicago, Ill., assignor to Goodman Manufacturing Company, Chicago, Ill., a corporation of Illinois Original No. 2,127,902, dated August 23, 1938, Serial No. 49,157, November 11, 1935. Application for reissue November 14, 1938, Serial No. 240,352

16 Claims. (Cl. 198—220)

This invention relates to improvements in feeding heads for reciprocating or shaker conveyers of the type used for gathering and transporting loose material such as coal, rock or the like.

More specifically my invention relates to improvements in feeding heads in which the extension and retraction of a telescoping trough section is controlled through friction devices engageable with and disengageable from said trough section at will during certain periods of the forward and return stroke of the main conveyer and has as its principal objects to provide an improved and simplified construction of feeding head, especially designed for work in places having an uneven or pitching bottom and having relatively low head room or vertical clearance.

Another object of my invention is to provide a new and improved support for the trough sections and feeding mechanism which is arranged to minimize frictional resistance and binding between the trough sections and feeding mechanism and to increase the frictional resistance of the telescoping trough section against the ground to reduce to a minimum the tendency of this trough section to move with the reciprocating trough section, particularly when being initially extended into a pile of coal.

As heretofore constructed, feeding devices for reciprocating conveyers have been connected to the forward end of the reciprocating trough section for movement therewith and have formed a support for the telescoping trough section. A feeding device so constructed is relatively heavy and the frictional resistance thereof against the telescoping trough section is such that there is a tendency for said trough section to move with the feeding device. This latter is especially true when feeding along ascending grades. There is also a tendency of binding between the telescoping trough section and the reciprocating trough section and feeding device where the bottom is uneven or is inclined upwardly or downwardly with respect to the main conveyer line. The device of my invention is so arranged as to avoid this binding and increase the frictional resistance of the telescoping trough section against the ground and reduce the frictional resistance between the feeding device and telescoping trough section by slidably supporting the telescoping trough section on the ground adjacent its forward and rearward ends independently of the rest of the conveyer and by mounting the forward end of the reciprocating trough section for movement along the telescoping trough section in such a manner that the telescoping trough section may form a support for the weight of the feeding mechanism and the forward end of the reciprocating trough section and permit the reciprocating trough section and feeding mechanism to freely move therealong.

Other objects of my invention will appear from time to time as the following specification proceeds.

My invention may best be understood with reference to the accompanying drawings wherein:

Figure 1 is a view in side elevation of a feeding mechanism attached to the forward end of a reciprocating conveyer showing the apparatus positioned for loading along a level bottom;

Figure 2 is a view in side elevation of the apparatus shown in Figure 1 showing the apparatus positioned for loading along a bottom which pitches downwardly with respect to the main conveyer line;

Figure 3 is a side elevational view of the apparatus shown in Figure 1, showing the apparatus positioned for loading along a bottom which pitches upwardly with respect to the main conveyer line;

Figure 4:
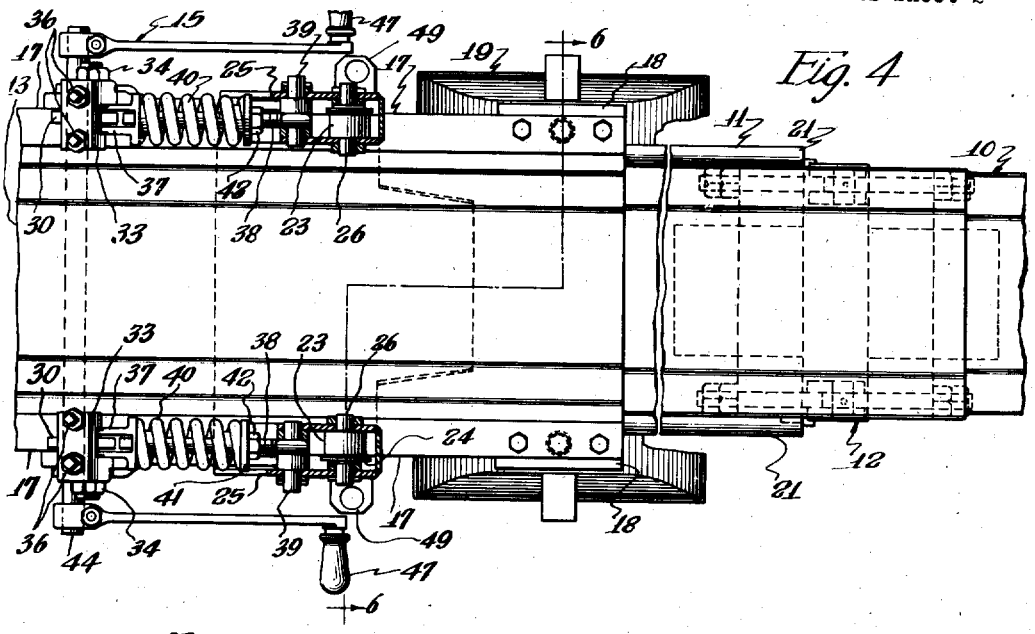
Figure 4 is an enlarged detail plan view of the feeding mechanism shown in Figure 1, with the extensible trough shown in an extended position and with certain parts of the feeding mechanism broken away and shown in horizontal section.

Referring now to the details of construction of the embodiment of my invention illustrated in the drawings, the main elements thereof consist of a reciprocating shaker conveyer pan line, generally indicated by reference character 10, having a reciprocating trough section 11 connected to the forward end thereof for pivotal movement with respect thereto about a horizontal transverse axis by means of a swivel connection, generally indicated by reference character 12. An extensible trough section or pick-up member 13 having a flared gathering shovel 14 at the forward end thereof extends from said reciprocating trough section and is adapted to be nested therein for extension or retraction with respect thereto.

The extensible trough section or pick-up member 13 is provided with a pair of laterally extending bearing plates 17, 17 secured to and extending outwardly from the upper flanges of said extensible trough section. Said bearing plates are adapted to be engaged by a feeding mechanism, generally indicated by reference character 15, for controlling the extension or retraction of said extensible trough section with respect to said reciprocating trough section.

Means are provided for supporting the rear end of said extensible trough section, together with the feeding mechanism which herein comprises a supporting shoe 19 connected to the rear end of the extensible trough section and adapted to engage and slide along the ground. Said supporting shoe has a pair of parallel spaced legs 18, 18 extending upwardly therefrom which are secured to the under surface of said bearing plates adjacent the rearward end thereof by means of suitable cap screws (see Figures 5 and 6). The forward end of said trough section is supported on the forward end of the shovel 14.

Said supporting shoe extends beneath the reciprocating trough section 11 and said supporting legs extend along opposite sides of said reciprocating trough section. Each of said legs is provided with a vertically disposed guide roller 20 which is adapted to engage a bearing member 21 extending along each upper outside of the reciprocating trough section. Said bearing members are herein preferably shown as being formed from a tubular material such as pipe, which is herein shown as being secured to the outer sides of said trough section in a suitable manner, such as welding.

The forward end of the reciprocating trough section 11 is slidably supported above the ground on the extensible trough section 13 by means of two sets of parallel spaced rollers 23, 23. Each set of said rollers includes one roller supported on and adapted to roll along the bearing member 17 and another roller extending beneath said bearing member and acting as a guide to prevent vertical displacement of said reciprocating trough section. Said rollers are provided with suitable flanges 24, 24 extending from the outer sides thereof and adapted to engage the outer ends of the bearing plates 17, 17 to guide said pick-up member against lateral displacement.

Each set of parallel spaced rollers 23, 23 is mounted on a bracket 25 on parallel spaced transversely extending shafts 26, 26. Each of said brackets is spaced laterally from the outer sides of the reciprocating trough section 10 and extends upwardly from opposite sides of a supporting plate 27 and the major portion thereof is disposed above said conveyer trough. Said supporting plate is secured to and extends across the bottom of the forward end of said reciprocating trough section and upwardly along and laterally beyond opposite sides of said trough section. Said brackets are of a C-shaped formation having the open portion thereof extending inwardly towards the center of said conveyer trough and said shafts extend transversely across vertical open portions of said brackets and are supported therein above and below the inner openings thereof.

It will be seen from the foregoing that since the extensible trough section 13 is independently supported at its rearward end on the supporting shoe 19 and on the ground at its forward end, and since the forward end of said reciprocating trough section is slidably supported on the bearing plates 17, 17 on the rollers 23, 23, that said reciprocating trough section may reciprocably move along said extensible trough section when said trough sections are disposed in various tilting positions with respect to each other, and that the arrangement is such as to minimize binding between said trough sections and increase the frictional resistance of said extensible trough section against the ground.

Figure 5:
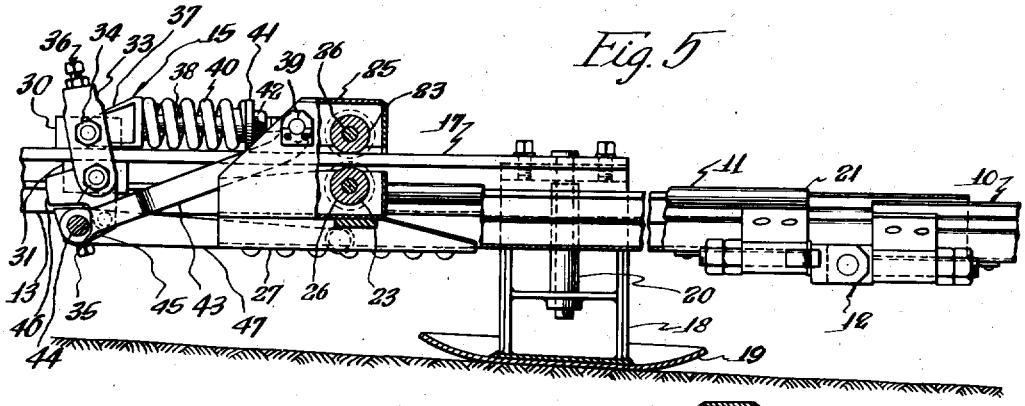
Figure 5 is an enlarged side elevation of the device shown in Figure 1, with the parts positioned as shown in Figure 4 and with certain parts broken away and shown in vertical section.
Figure 6:
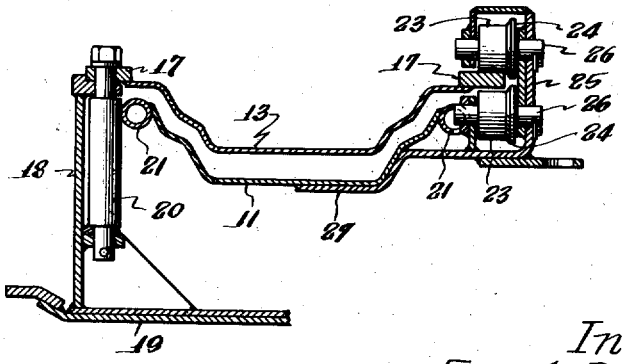
Figure 6 is a sectional view taken substantially along line 6—6 of Figure 4.

With reference now in particular to the feeding means for extending said extensible trough section with respect to said reciprocating trough section, as shown in detail in Figures 4 and 5, and yet permitting the pivotal rocking movement of said extensible trough section with respect to said reciprocating trough section, as just described, said feeding means is similar to that disclosed in the patent of William W. Sloane, No. 2,005,567, but is mounted on the forward end of the reciprocating trough section, instead of on a separable feeding head connected to said trough section. Said feeding means consists of two sets of friction blocks 30 and 31, each of which sets is mounted on a carrier member 33 of a C-shaped formation. One carrier member is provided at each side of the extensible trough 11, and since the construction of each carrier member and the means for controlling the operation thereof is similar, a description of one will suffice for both.

Each carrier member 33 has the blocks 30 and 31 mounted therein on bolts 34 and 35, respectively. Said bolts extend transversely across a vertical open portion of said C-shaped carrier and are adapted to be adjustably moved towards each other in a suitable manner; as, for instance, set screws 36, 36.

The connection between said carrier member and said reciprocating trough section includes a bifurcated connecting member 37 pivotally connected to the bolt 34 on opposite sides of the block 30 and extending rearwardly therefrom. Said connecting member has a rod 38 slidably mounted therein which extends rearwardly therefrom and has a rearward end formed in the shape of an open eye which is adapted to be engaged by a pivotal pin 39 mounted at its ends in the bracket 25 adjacent the forward end thereof. A compression spring 40 is interposed between the rearward end of the connecting member 37 and a collar 41, which collar abuts a nut 42 threaded on said shaft. Thus, said connecting member and compression spring provide a yieldable pivotal connection between the bracket 25 and carrier member 33 which permits the blocks 30 and 31 to be automatically released from the bearing plates 17, 17 when the forward end of the shovel 14 engages an obstruction.

A link 43 is pivotally mounted on the pin 39 and extends angularly downwardly therefrom along the outer side of the extensible trough section 13. Said link has its lower end pivotally connected to a transversely extending shaft 44. Said transversely extending shaft has a crank arm 45 secured thereto and extending rearwardly therefrom, the outer end of which crank arm is pivotally secured to a rocking member 46. Said rocking member is in turn pivotally connected to the lower bolt 35 of the carrier member 33. An operating handle 47 is provided on each outer end of the shaft 44 for rocking said shaft and the rocking members 46, 46.

Rocking movement of said rocking members will pivot the carrier members 33, 33 about the axes of the upper bolts 34, 34. Thus, upon reciprocating movement of the conveyer pan line, rocking movement of the carrier members 33, 33 in a direction to engage the grip blocks 30 and 31 with the bearing plates 17, 17 during the forward stroke of the conveyer and disengage said grip blocks from said bearing plates during the rearward stroke of the conveyer will extend the extensible trough section with respect to said reciprocating trough section. In a contrary manner, engagement of said grip blocks with the bearing members 17, 17 upon the rearward stroke of the conveyer, and disengagement of said grip blocks from said bearing plates upon the forward stroke of the conveyer, will retract said extensible trough section within said reciprocating trough section.

When the operating handles 47, 47 are in the position shown in Figures 4 and 5, and the lever arms 45, 45 are past a dead center position with respect to the pivotal axes of the rocking members 46, 46, said grip blocks will be locked in engagement with said bearing members and said extensible section will be moved with said reciprocating trough section upon reciprocation thereof.

When said operating handles are in an upstanding position so that the carrier members 33, 33 are supported in an upright position with respect to the extensible trough, the blocks 30 and 31 will be disengaged from the bearing plates 17, 17 and the reciprocating trough section 11 may freely reciprocate along said extensible trough section.

Means are provided to permit said feeding mechanism to be operated when the bottom is inclined transversely with respect to the main trough line which includes an eyepiece 49 extending outwardly from each bracket 25 adjacent the rearward end thereof. Said eyepiece is adapted to have a suitable flexible connecting member (not shown) connected thereto, the opposite end of which flexible connecting member is adapted to be secured to a prop or other fixed abutment so it may swing like a pendulum about its point of connection to said prop upon reciprocating movement of said conveyer.

It should here be noted that since the trough section 11 is free to move along the extensible trough section 13, which forms a support for said reciprocating trough section and the feeding mechanism, and since the weight of said extensible trough section is supported on the ground independently of the rest of the conveyer, the frictional resistance of said extensible trough section against the ground will be such that it will tend to remain in fixed relation with respect to the mine floor during reciprocable movement of the conveyer, when operating along ascending or descending grades as well as along the level, except when gripped by the feeding mechanism.

It should further be noted that since said extensible trough section rests on the ground at its forward end and is supported above the ground at its rearward end on the shoe 19, and that since said reciprocating trough section is supported for free reciprocating movement therealong, said trough sections may be inclined with respect to each other without binding therebetween, and the tendency for said extensible trough section to slip back or be drawn back along said reciprocating trough section by the feeding head when working along ascending grades has been reduced to a minimum.

It will be seen from the foregoing that the feeding mechanism extends forwardly from and is pivotally supported on the reciprocating trough section a considerable distance ahead of the supporting shoe which supports the rearward end of the extensible trough section above the ground, and that the arrangement is such that the troughs may readily be inclined with respect to each other and said feeding mechanism is effective when said troughs are tilted with respect to each other.

It will also be seen that the usual heavy supporting means for the feeding mechanism which has heretofore been utilized for feeding the extensible trough section, with its relatively great frictional resistance against the ground and the extensible trough section, has been eliminated and a rolling support for the forward end of said reciprocating trough on the extensible trough has been provided in its place which reduces frictional losses and increases the efficiency of the feeding mechanism and permits said trough sections to readily conform to uneven mine floors and be inclined with respect to each other without binding.

While I have herein shown and described one form in which my invention may be embodied, it will be understood that the construction and arrangement of the various parts may be changed or altered without departing from the spirit or scope thereof. Furthermore, I do not wish to be construed as limiting myself to the precise construction illustrated, excepting as it may be limited in the appended claims.

I claim as my invention:

1. In a shaker conveyer, an extensible trough section wholly supported on the ground adjacent its forward and rearward ends independently of the remainder of the conveyer, and a reciprocating trough section supported on said extensible trough section for reciprocable movement therealong in such a manner as to be freely movable therealong and cause an increase in the frictional resistance of said extensible trough section against the ground, said reciprocating trough section having feed control means pivotally connected to the forward end thereof and extending in advance thereof and adapted to selectively grip said extensible trough section and cause it to move with said reciprocating trough section or permit said reciprocating trough section to freely move along said extensible trough section.

2. In a feeding device for shaker conveyers, an extensible trough section slidably supported on the ground adjacent its forward end and above the ground adjacent its rearward end so the entire weight of said trough section rests on the ground independently of the rest of the conveyer, a reciprocating trough section having feed control means pivoted thereon and extending forwardly of the forward end thereof, and a supporting connection between said extensible trough section and said reciprocating trough section for supporting said reciprocating trough section on said extensible trough section for reciprocable movement along said extensible trough section in such a manner as to cause an increase in the frictional resistance of said extensible trough section against the ground.

3. In a feeding device for shaker conveyers, a reciprocating trough section, an extensible trough section, a shoe for supporting the rearward end of said extensible trough section above the ground and permitting the forward end of said trough section to rest on the ground so said extensible trough section may be supported on the ground independently of the conveyer, and a supporting connection between said reciprocating and extensible trough sections permitting said reciprocating trough section to be supported for movement along said extensible trough section comprising anti-friction means mounted on said reciprocating trough section having engagement with opposite sides of said extensible trough section.

4. In a feeding device for shaker conveyers, a reciprocating trough section, an extensible trough section, a shoe for supporting the rearward end of said extensible trough section above the ground and permitting the forward end of said trough section to rest on the ground so said extensible trough section may be supported on the ground independently of the conveyer, and a supporting connection between said reciprocating and extensible trough sections permitting said reciprocating trough section to be supported for movement along said extensible trough section comprising bearing plates extending laterally from the upper side of said extensible trough section, and anti-friction members mounted on said reciprocating trough section and having engagement with said bearing plates.

5. In a feeding device for shaker conveyers, an extensible trough section, a shoe for supporting the rearward end of said extensible trough section above the ground and permitting the forward end of said trough section to rest on the ground so said extensible trough section may be supported on the ground independently of the conveyer, a reciprocating trough section, means supported by said reciprocating trough section for extending or retracting said extensible trough section with respect to said reciprocating trough section including a pair of clamping devices adapted to engage plates extending laterally from said extensible trough section, and a supporting connection between said extensible and reciprocating trough sections permitting said reciprocating trough section to slidably move along said extensible trough section and increasing the frictional resistance of said extensible trough section against the ground comprising anti-friction means on said reciprocating trough section movable along said bearing plates and forming a movable support for said reciprocating trough section.

6. In a feeding device for shaker conveyers, an extensible trough section, a shoe for supporting the rearward end of said extensible trough section above the ground and permitting the forward end of said trough section to rest on the ground so said extensible trough section may be supported on the ground independently of the conveyer, a reciprocating trough section, means supported by said reciprocating trough section for extending or retracting said extensible trough section with respect to said reciprocating trough section including a pair of clamping devices adapted to engage plates extending laterally from said extensible trough section, and a supporting connection between said extensible and reciprocating trough sections permitting said reciprocating trough section to slidably move along said extensible trough section and increasing the frictional resistance of said extensible trough section against the ground comprising rollers supported at the forward end of said reciprocating trough section and movable along said bearing plates and forming a movable support for said reciprocating trough section.

7. In a feeding device for shaker conveyers, an extensible trough section slidably supported on the ground adjacent its forward end and above the ground adjacent its rearward end, a reciprocating trough section having feed control means pivoted thereon and extending forwardly of the forward end thereof, and a plurality of rollers mounted on said reciprocating trough section and engaging said extensible trough section for supporting the forward end of said reciprocating trough section for reciprocable movement along said extensible trough section.

8. In a feeding device for shaker conveyers, a reciprocating trough section, an extensible trough section, friction grip feeding means pivotally connected to said reciprocating trough section and adapted to have selective engagement with said extensible trough section forwardly of said reciprocating trough section during the forward or return stroke of said conveyer for controlling feeding movement of said extensible trough section, and means for supporting the forward end of said reciprocating trough section on said extensible trough section for movement therealong above the ground and permitting axial movement of said trough sections with respect to each other in vertical planes comprising a supporting shoe engageable with the ground and supporting the rearward end of said extensible trough section above the ground, and a supporting connection between said trough sections for supporting the forward end of said reciprocating trough section for movement along said extensible trough section above the ground.

9. In a feeding device for shaker conveyers, a reciprocating trough section, an extensible trough section, means for extending or retracting said extensible trough section with respect to said reciprocating trough section comprising a pair of brackets extending upwardly from the forward end of said reciprocating trough section and wholly supported thereby, a carrier member pivotally connected to each of said brackets and disposed forwardly of the forward end thereof, each of said carrier members having a pair of opposed friction blocks disposed above and below a portion of said extensible trough, means for engaging said friction blocks with said extensible trough during the forward or return stroke of the conveyer, and means for supporting the forward end of said reciprocating trough section above the ground and permitting axial movement of said trough sections with respect to each other in a vertical plane comprising a shoe supporting the rearward end of said extensible trough section above the ground and anti-friction means mounted in said brackets and having supporting engagement with said extensible trough section.

10. In a feeding device for shaker conveyors, a reciprocating conveyer trough section, an extensible trough section, means for extending or retracting said extensible trough section with respect to said reciprocating trough section comprising a pair of friction grip blocks supported by said reciprocating trough section in advance thereof and adapted to engage said extensible trough section above and below a portion thereof, a pair of brackets extending upwardly from opposite sides of the forward end of said reciprocating trough section and wholly supported thereby, a carrier member disposed forwardly of said brackets and pivotally connected thereto and forming a pivotal support for said friction grip blocks, means for engaging said friction grip blocks with said extensible trough during the forward or return stroke of the conveyer, and means for supporting the forward end of said reciprocating trough section for movement along said extensible trough section above the ground and permitting axial movement of said trough sections with respect to each other in a vertical plane comprising a shoe supporting the rearward end of said extensible trough section above the ground and a pair of parallel spaced rollers on each of said brackets engaging said extensible trough section above and below a portion thereof.

11. In a feeding device for shaker conveyers, a reciprocating conveyer trough section, an extensible trough section, a pair of brackets extending upwardly from the forward end of said reciprocating trough section and wholly supported thereby above the ground, a carrier member pivotally connected to each of said brackets and disposed forwardly thereof, each of said carrier members having a pair of opposed friction blocks disposed above and below a portion of said extensible trough, means for engaging said friction blocks with said extensible trough during the forward or return stroke of the conveyer for controlling feeding movement of said extensible trough section, and means for supporting the forward end of said reciprocating trough section for movement along said extensible trough section above the ground and permitting axial movement of said extensible trough section with respect to said reciprocating trough section in a vertical direction comprising a slidable supporting connection between said brackets and said extensible trough section and a supporting shoe adapted to slidably engage the ground and support the rearward end of said extensible trough section above the ground so said extensible trough section will be entirely supported on the ground independently of the rest of the conveyer, said shoe having portions thereof extending upwardly along opposite sides of said reciprocating trough section having supporting engagement with the rearward end of said extensible trough section.

12. In a feeding device for a shaker conveyer, a reciprocating conveyer trough section, an extensible trough section having a forward end adapted to engage the ground, a pair of brackets extending upwardly from the forward end of said reciprocating trough section and wholly supported thereby above the ground, a carrier member pivotally connected to each of said brackets and disposed forwardly thereof, each of said carrier members having a pair of opposed friction blocks disposed above and below a portion of said extensible trough, means for engaging said friction blocks with said extensible trough during the forward or return stroke of the conveyer, and means for slidably supporting the forward end of said reciprocating trough section on said extensible trough section for movement therealong and permitting movement of said extensible trough section with respect to said reciprocating trough section in a vertical direction comprising a slidable supporting connection between said brackets and said extensible trough section, and a supporting shoe adapted to slidably engage the ground, said shoe having portions thereof extending upwardly along opposite sides of said reciprocating trough section and having rollers mounted therein engaging said reciprocating trough section, and said shoe being secured to and supporting the rearward end of said extensible trough section above the ground independently of the rest of the conveyer.

13. In a shaker conveyer, an extensible trough section having a shovel at its forward end adapted to engage the ground, a reciprocating trough section having its forward end telescopically supported relative to said extensible section, feed control means affording selective engagement between said extensible and reciprocating trough sections to cause said sections to move in unison or permit them to telescope freely with respect to each other, and a ground engaging shoe adjacent the rear end of said extensible trough section for independently supporting said trough section on the ground, said shoe and extensible trough section being so arranged that said reciprocating trough section and feed control means are supported on said extensible trough section for free movement therealong, and the weight of said extensible trough section, feed control means, and reciprocating trough section is supported on the ground by said shoe and shovel.

14. In a shaker conveyer, an extensible trough section having a shovel at its forward end adapted to engage the ground, a ground engaging shoe supporting the rear end of said extensible trough section, so that the weight of said extensible trough section is independently supported on the ground, a reciprocating trough section having its forward end telescopically supported relative to said extensible section, and feed control means also supported on said extensible trough section intermediate said scoop and said supporting shoe and affording selective engagement between said extensible and reciprocating trough sections to cause said sections to move in unison or to permit them to telescope freely with respect to each other.

15. In a shaker conveyer, an extensible trough section having a shovel at its forward end adapted to engage the ground, a ground engaging shoe adjacent the rear end of said extensible trough section, so that the weight of said extensible trough section is independently supported on the ground, a reciprocating trough section having its forward end telescopically supported for movement along said extensible trough section, and feed control means carried by the forward end of said reciprocating trough section and selectively engageable with said extensible trough section between said scoop and supporting shoe so as to cause said sections to move in unison or telescope freely with respect to each other.

16. In a feeding device for shaker conveyers, a reciprocating trough section, an extensible trough section engageable with the ground at its forward end, feed control means connected to said reciprocating trough section and adapted to have selective engagement with said extensible trough section during the forward or return stroke of the conveyer for controlling feeding movement of said extensible trough section, means for supporting the forward end of said reciprocating trough section for free telescopic movement with respect to said extensible trough section and permitting rocking movement of said trough sections with respect to each other in vertical planes comprising a ground engaging supporting shoe supporting the rearward end of said extensible trough section above the ground, and a supporting connection between said trough sections for supporting the forward end of said reciprocating trough section for movement along said extensible trough section.

ERNST R. BERGMANN.